US012651584B2

(12) United States Patent
Phan et al.

(10) Patent No.: US 12,651,584 B2
(45) Date of Patent: Jun. 9, 2026

(54) POWER MANAGEMENT OF DISPLAY DATA DURING AN IDLE SCREEN

(71) Applicants: Advanced Micro Devices, Inc., Santa Clara, CA (US); ATI Technologies ULC, Markham (CA)

(72) Inventors: Gia Tung Phan, Markham (CA); Dennis Kin-Wah Au, Markham (CA); Oswin Hall, Markham (CA); Ashish Jain, Austin, TX (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 270 days.

(21) Appl. No.: 18/128,797

(22) Filed: Mar. 30, 2023

(65) Prior Publication Data

US 2024/0331659 A1    Oct. 3, 2024

(51) Int. Cl.
*G09G 5/36* (2006.01)

(52) U.S. Cl.
CPC ....... *G09G 5/363* (2013.01); *G09G 2330/021* (2013.01); *G09G 2360/123* (2013.01)

(58) Field of Classification Search
CPC ............. G09G 5/363; G09G 2330/021; G09G 2360/123
USPC .................................. 345/419, 519; 713/323
See application file for complete search history.

(56) References Cited

U.S. PATENT DOCUMENTS 8,949,554 B2 2/2015 Sadowski et al.
11,907,043 B2 * 2/2024 Zhou ..................... G06F 1/3296
12,299,940 B2 * 5/2025 Kothandaraman ..... G06T 9/005
2004/0039952 A1 * 2/2004 Kanapathippillai .... G06F 9/381 713/300
2004/0078608 A1 * 4/2004 Kanapathippillai .. G06F 1/3253 712/E9.058
2009/0235105 A1 9/2009 Branover et al.
2009/0300299 A1 12/2009 Saxe et al.
2010/0058078 A1 3/2010 Branover et al.

(Continued)

OTHER PUBLICATIONS

"2nd Generation Intel Core Processor Family Desktop, Intel Pentium Processor Family Desktop, and Intel Celeron Processor Family Desktop", Datasheet, Document No. 324641-007, Sep. 2012, 112 pages, vol. 1.

*Primary Examiner* — Prabodh M Dharia
(74) *Attorney, Agent, or Firm* — Kowert, Hood, Munyon, Rankin & Goetzel, P.C.; Rory D. Rankin

(57) ABSTRACT

An apparatus and method for efficiently managing power consumption among multiple, replicated functional blocks of an integrated circuit. An integrated circuit includes multiple, replicated functional blocks that use separate power domains. Data of a given type is stored in an interleaved manner among the multiple functional blocks. When control circuitry detects a low-performance mode, commands are sent to the multiple functional blocks specifying storing data of the given type in a contiguous manner in one or more of the caches of the multiple functional blocks and the memories connected to the multiple functional blocks. Following, the control circuitry transitions the memories to a sleep state and transitions all but one of the functional blocks to the sleep state. The functional blocks rotate amongst themselves with a single functional block being in the active state and servicing requests based on which data of the given type is targeted by the requests.

20 Claims, 9 Drawing Sheets

(56) References Cited

U.S. PATENT DOCUMENTS

| | | | | |
|---|---|---|---|---|
| 2010/0287394 | A1 | 11/2010 | Branover et al. | |
| 2011/0078478 | A1 | 3/2011 | Branover et al. | |
| 2011/0320751 | A1 | 12/2011 | Wang et al. | |
| 2012/0287127 | A1* | 11/2012 | Ikeda | H04N 13/359<br>345/419 |
| 2014/0281616 | A1* | 9/2014 | Moran | G06F 1/3287<br>713/323 |
| 2019/0095305 | A1* | 3/2019 | Samson | G06F 15/781 |
| 2019/0221241 | A1* | 7/2019 | Wen | G06F 11/3024 |
| 2023/0057492 | A1* | 2/2023 | Kothandaraman | G06T 9/001 |
| 2023/0400908 | A1* | 12/2023 | Bhattacharyya | G06F 12/0284 |

* cited by examiner

POWER MANAGEMENT OF DISPLAY DATA DURING AN IDLE SCREEN

BACKGROUND

Description of the Relevant Art

Both planar transistors (devices) and non-planar transistors are fabricated for use in integrated circuits within semiconductor chips. A variety of choices exist for placing processing circuitry in system packaging to integrate multiple types of integrated circuits. Some examples are a system-on-a-chip (SOC), multi-chip modules (MCMs) and a system-in-package (SiP). Mobile devices, desktop systems, and servers use these packages. Regardless of the choice for system packaging, in several uses, power consumption of modern integrated circuits has become an increasing design issue with each generation of semiconductor chips.

As power consumption increases, more costly cooling systems such as larger fans and heat sinks are utilized to remove excess heat and prevent failure of the integrated circuit. However, cooling systems increase system costs. The power dissipation constraint of the integrated circuit is not only an issue for portable computers and mobile communication devices, but also for high-performance desktop computers and server computers. Power management circuitry assigns operating parameters to different partitions of an integrated circuit. The operating parameters include at least an operating power supply voltage and an operating clock frequency.

Although a partition can have no computational tasks to perform during a particular time period while an application is running, the power management circuitry is unable to assign a sleep state to the partition due to occasional maintenance tasks targeting the partition. Recent integrated circuits include multiple replicated functional blocks in the partition to increase throughput. Each functional block includes one or more sub-blocks for data processing, one or more levels of cache, and an interface to communicate with local memory. In one example, when a video graphics application is executed by the integrated circuit, a partition that includes multiple functional blocks responsible for rendering video frame data has no further computational tasks to perform when the image presented on a display device has no updates. The image remains unchanged during a pause of the application, during a wait time for user input information, or other condition that doesn't require updates to the image despite the application is still running. However, the power management circuitry is unable to assign a sleep state to the multiple functional blocks due to periodic refresh operations that request data to be retrieved from the multiple functional blocks and sent to the display device.

In view of the above, methods and mechanisms for efficiently managing power consumption of multiple, replicated functional blocks of an integrated circuit are desired.

BRIEF DESCRIPTION OF THE DRAWINGS

FIG. 6 is a generalized block diagram of a computing system that manages power consumption among replicated functional blocks of an integrated circuit.

Figure 1:
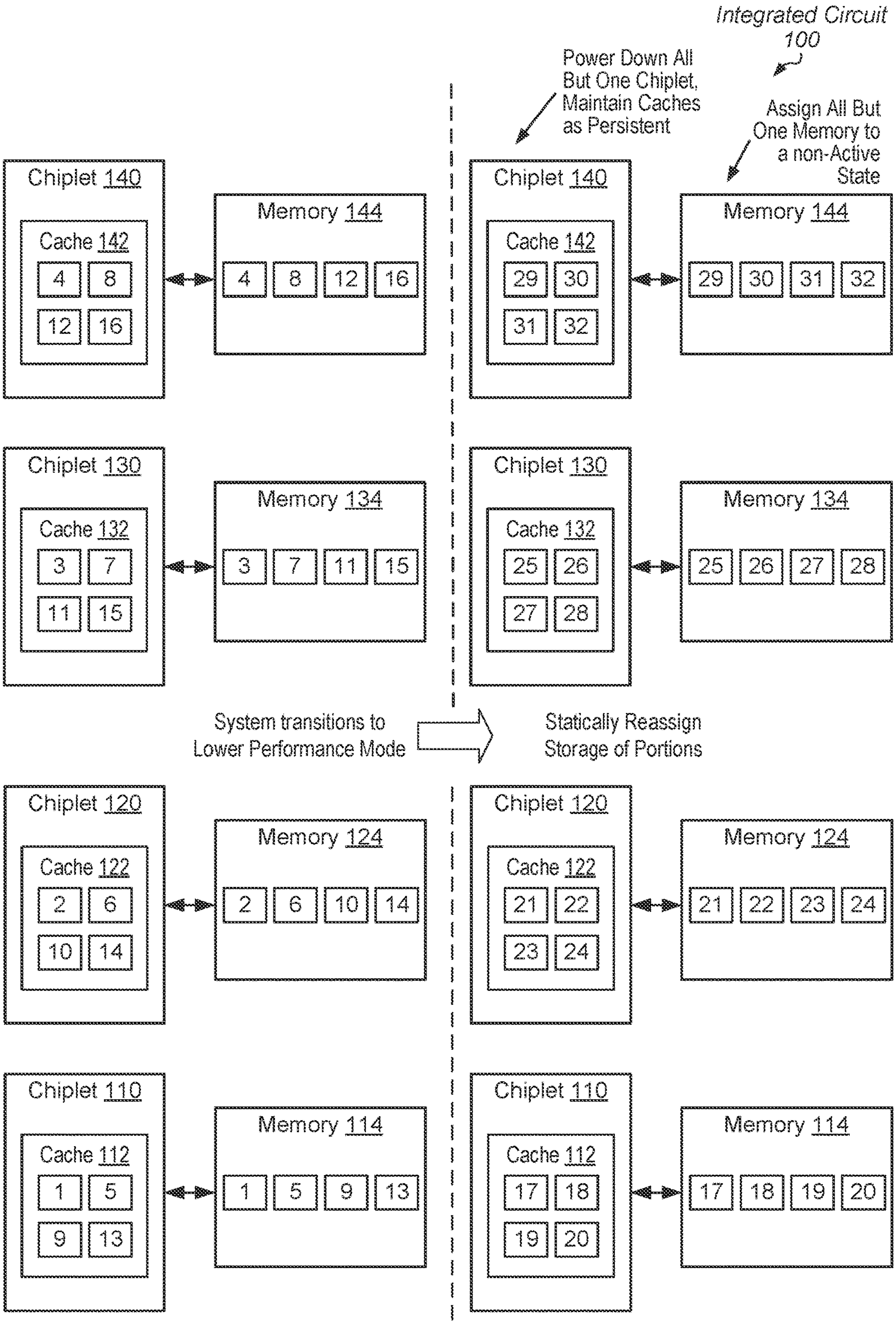
FIG. 1 is a generalized block diagram of an integrated circuit that manages power consumption among replicated chiplets.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently managing power consumption among multiple, replicated functional blocks of an integrated circuit are contemplated. In the case of using a multi-chip module (MCM), one or more of multiple, replicated chiplets are connected to separate power rails, and therefore, can use separate power domains. The multiple, replicated chiplets are provided from a silicon wafer separate from silicon wafers of other functional blocks used in the MCM. In the case of using a system-on-chip (SoC), one or more of the functional blocks are connected to separate power rails, and therefore, can use separate power domains. The multiple, replicated functional blocks are provided from a same silicon wafer that provides other functional blocks used in the SoC. Therefore, the techniques and steps described in the upcoming description directed to power management of multiple, replicated chiplets placed in a MCM are also applicable for power management of multiple, replicated functional blocks placed in an SoC.

In various implementations, an integrated circuit includes multiple, replicated functional blocks that use separate power domains. The multiple functional blocks store data of a given type in an interleaved manner among the multiple functional blocks. In an implementation, the data of the given type is video frame data of a frame buffer that has been rendered by the multiple functional blocks. A low-performance mode indicates a static screen of the display device connected to the display controller. When control circuitry detects the low-performance mode, the control circuitry sends commands to the multiple functional blocks specifying storing data of the given type in a contiguous manner in one or more of the caches of the multiple functional blocks and the memories connected to the multiple functional blocks. Following, the control circuitry transitions the memories to a sleep state and transitions one or more functional blocks to a sleep state.

In another implementation, the control circuitry powers down one or more of the functional blocks while maintaining the one or more corresponding caches in the sleep state. For example, the control circuitry turns off one or more power supply reference levels to portions of the corresponding one or more functional blocks. However, the caches of these corresponding one or more functional blocks maintain connection to a power supply reference level with a voltage magnitude associated with the sleep state. The control circuitry sends control signals to power switches that disconnect, from a physical voltage plane, the one or more power supply reference levels used by portions other than the caches of the corresponding one or more functional blocks. The functional blocks process requests targeting the data of the given type using the particular functional block that is currently in an active state. The control circuitry rotates among the functional blocks with a single functional block being in the active state and servicing requests based on which data of the given type is targeted by the requests.

Turning now to FIG. 1, a generalized block diagram is shown of an integrated circuit 100 that manages power consumption among replicated chiplets. In the illustrated implementation, the integrated circuit 100 includes multiple replicated chiplets 110, 120, 130 and 140. Each of the chiplets 110, 120, 130 and 140 is connected to a corresponding one of the memories 114, 124, 134 and 144. In addition, in a corresponding one of the caches 112, 122, 132 and 142, each of the chiplets 110, 120, 130 and 140 is capable of selectively storing a copy of data that is stored in the memories 114, 124, 134 and 144.

As used herein, a "chiplet" is also referred to as a "functional block," or an "intellectual property block" (or IP block). However, a "chiplet" is a semiconductor die (or die) fabricated separately from other dies, and then interconnected with other dies in a single integrated circuit in system packaging known as multi-chip modules (MCMs). A chiplet is a type of functional block. However, a functional block can also include blocks fabricated with other functional blocks on a larger semiconductor die such as a system-on-chip (SoC). Therefore, a chiplet is a subset of the types of functional blocks. A chiplet is fabricated as multiple copies by itself on a silicon wafer, rather than fabricated with other functional blocks on a larger semiconductor die such as an SoC. For example, a first silicon wafer (or first wafer) is fabricated with multiple copies of a first chiplet, and this first wafer is diced using laser cutting techniques to separate the multiple copies of the first chiplet.

A second silicon wafer (or second wafer) is fabricated with multiple copies of a second chiplet, and this second wafer is diced using laser cutting techniques to separate the multiple copies of the second chiplet. The first chiplet provides functionality different from the functionality of the second chiplet. One or more copies of the first chiplet is placed in an integrated circuit, and one or more copies of the second chiplet is placed in the integrated circuit. The first chiplet and the second chiplet are interconnected to one another within a corresponding MCM. Such a process replaces a process that fabricates a third silicon wafer (or third wafer) with multiple copies of a single, monolithic semiconductor die that includes the functionality of the first chiplet and the second chiplet as integrated functional blocks within the single, monolithic semiconductor die.

Process yield of single, monolithic dies on a silicon wafer is lower than process yield of smaller chiplets on a separate silicon wafer. In addition, a semiconductor process can be adapted for the particular type of chiplet being fabricated. With single, monolithic dies, each die on the wafer is formed with the same fabrication process. However, it is possible that an interface functional block does not require process parameters of a semiconductor manufacturer's expensive process that provides the fastest devices and smallest geometric dimensions that are beneficial for a high throughput processing unit on the die. With separate chiplets, designers can add or remove chiplets for particular integrated circuits to readily create products for a variety of performance categories. In contrast, an entire new silicon wafer must be fabricated for a different product when single, monolithic dies are used.

The following description describes power management of multiple, replicated chiplets placed in a MCM where the multiple, replicated chiplets are provided from a silicon wafer separate from silicon wafers of other functional blocks used in the MCM. However, the following description is also applicable to the power management of multiple, replicated functional blocks located on a SoC where the multiple, replicated functional blocks are provided from a same silicon wafer that provides other functional blocks used in the SoC. In the case of using an MCM, one or more of the chiplets are connected to separate power rails, and therefore, can use separate power domains. Similarly, in the case of using an SoC, one or more of the functional blocks are connected to separate power rails, and therefore, can use separate power domains.

Although not shown for ease of illustration, each of the chiplets 110, 120, 130 and 140 also includes one or more sub-blocks that provide a variety of functionalities. These sub-blocks utilize transistors. As used herein, a "transistor" is also referred to as a "semiconductor device" or a "device." The chiplets 110, 120, 130 and 140 uses p-type metal oxide semiconductor (PMOS) field effect transistors FETS (or pfets) in addition to n-type metal oxide semiconductor (NMOS) FETS (or nfets). In some implementations, the devices (or transistors) in the memory array portion 100 are planar devices. In other implementations, the devices (or transistors) in the memory array portion 100 are non-planar devices. Examples of non-planar transistors are tri-gate transistors, fin field effect transistors (FETs), and gate all around (GAA) transistors. In some implementations, the chiplets 110, 120, 130 and 140 includes one or more three-dimensional integrated circuits (3D ICs). A 3D IC includes two or more layers of active electronic components integrated both vertically and/or horizontally into a single circuit. In one implementation, interposer-based integration is used whereby the 3D IC is placed next to a central processing unit (CPU) that includes one or more general-purpose processor cores. Alternatively, a 3D IC is stacked directly on top of another IC.

As shown, each of the chiplets 110, 120, 130 and 140 and each of the memories 114, 124, 134 and 144 stores a copy of one or more portions of data of a given type. Each of the memories 114, 124, 134 and 144 is one of a variety of types of dynamic random-access memory (DRAM). In an implementation, the data of the given type is video frame data stored in a frame buffer implemented by the memories 114, 124, 134 and 144. The portions of data of the given type are shown as numbered boxes where the number is used to identify it. In some implementations, each portion of data is a contiguous portion compared to a previous portion of a larger data set (such as a video frame buffer) where the previous portion has a number identifying it that is one less than the number identifying the current portion. For example, portion "2" is a next contiguous portion following portion "1." In an implementation, each portion has a same size such as a size of a page of DRAM or other. In other implementations, one or more portions have a different size.

In the illustrated implementation, the memory 114 stores a copy of the portion "1," the portion "5," the portion "9" and the portion "13." The memory 124 stores a copy of the portion "2," the portion "6," the portion "10" and the portion "14." The memory 134 stores a copy of the portion "3," the portion "7," the portion "11" and the portion "15." The memory 144 stores a copy of the portion "4," the portion "8," the portion "12" and the portion "16." The caches 112, 122, 132 and 142 store a copy of data that is stored in a corresponding one of the memories 114, 124, 134 and 144. For example, the cache 112 stores a copy of the portion "1," the portion "5," the portion "9" and the portion "13." In an implementation, each of the caches 112, 122, 132 and 142 is a last-level cache of a corresponding one of the chiplets 110, 120, 130 and 140, and supports a writeback cache policy. In another implementation, the caches 112, 122, 132 and 142 support a writethrough cache policy.

In an implementation, the chiplets 110, 120, 130 and 140 process tasks of a video graphics workload such as rendering video frame data for a display device (not shown). The data of the given type is video frame data of a frame buffer that has been rendered by the chiplets 110, 120, 130 and 140. This data of the given type is sent from the chiplets 110, 120, 130 and 140 to a display controller and then to the display device. In some implementations, the chiplets 110, 120, 130 and 140 store data of the given type in an interleaved manner amongst themselves as shown in the illustrated implementation. For example, a first portion of the data of the given type (portion "1") is stored in a first chiplet (chiplet 110), and a second portion different (portion "2") from the first portion (portion "1") of the data of the given type is stored in a second chiplet (chiplet 120). A third portion (portion "3") different from the first portion and the second portion of the data of the given type is stored in a third chiplet (chiplet 110), and so on. When the last chiplet (chiplet 140) of the multiple chiplets has a portion (portion "4") of the data of the given type stored in it, a next portion (portion "5") of the data of the given type is stored in the first chiplet (chiplet 110). Data storage of the data of the given type continues in this manner.

The chiplets 110, 120, 130 and 140 store the portions "1" to "16" in the interleaved manner in the memories 114, 124, 134 and 144 in order to hide overhead latency (penalty) of the memory devices used to implement the memories 114, 124, 134 and 144. For example, each of the steps of opening a page in DRAM, storing the targeted page in a row buffer, accessing the row buffer, and closing the page includes appreciable latency or penalty. In an implementation, power management circuitry (not shown) either determines or assigns a low-performance mode to a computing system using the chiplets 110, 120, 130 and 140, or receives an indication of the low-performance mode. For example, a video graphics application no longer updates frame data to be viewed on the display device. It is possible that the video graphics application is paused or is waiting for further user input, and during the wait time, the scene or image is not updated on the display device. Therefore, the video processing subsystem of the computing system that utilizes the chiplets 110, 120, 130 and 140 enters an idle state (or an idle condition) although the video graphics application has not stopped being executed.

When control circuitry, such as the power management circuitry (or other control circuitry), determines the integrated circuit 100 is in a low-performance mode or assigns the integrated circuit 100 to transition to a low-performance mode, the control circuitry sends commands or indications to either the chiplets 110, 120, 130 and 140, or a direct memory access (DMA) engine. These commands or indications specify storing data of the given type in a contiguous manner in the memories 114, 124, 134 and 144, rather than in an interleaved manner among the memories 114, 124, 134 and 144. Therefore, the control circuitry causes the chiplets 110, 120, 130 and 140 to store data in a contiguous manner, responsive to a mode of operation such as the low-performance mode. The low-performance mode is a mode of operation associated with a low-power power domain of multiple power domains. Each of the power domains includes at least operating parameters such as an operating power supply voltage and an operating clock frequency. Each of the power domains also includes control signals for enabling and disabling connections to clock generating circuitry and a power supply reference. In various implementations, each of the chiplets 110, 120, 130 and 140 utilizes a separate power rail and can be set to a separate power domain.

In some implementations, when the integrated circuit 100 enters the low-performance mode, the DMA engine or other unit does not provide updated data of the given type to the chiplets 110, 120, 130 and 140. Rather, the data of the given type currently stored among the memories 114, 124, 134 and 144 is the last video frame to be received until the low-performance mode ends. However, in an implementation, the DMA engine or other unit provides a last frame to the chiplets 110, 120, 130 and 140, but this last frame is not updated data, but rather, this last frame is a copy of the frame already currently stored among the memories 114, 124, 134 and 144. In such an implementation, the portion "17" is a copy of portion "1," the portion "18" is a copy of portion "2," the portion "19" is a copy of the portion "3," and so on. In another implementation, when the integrated circuit 100 enters the low-performance mode, the DMA engine or other unit does not provide any additional data of the given type to the chiplets 110, 120, 130 and 140. Further details of this implementation are provided in the description of the integrated circuit 300 (of FIG. 3).

In the low-performance mode of the integrated circuit 100, when data of the given type is retrieved from the DMA engine or other unit, and sent to the integrated circuit 100, the data of the given type is now stored in a contiguous manner in the memories 114, 124, 134 and 144, rather than in an interleaved manner among the memories 114, 124, 134 and 144. For example, the data includes the portions "17" to "32." The memory 114 stores portions "17," "18," "19" and "20" in a contiguous manner. Memories 124, 134 and 144 store portions in a contiguous manner as well. Following, the power management circuitry transitions each of the memories 114, 124, 134 and 144 to a sleep state. In an implementation, the sleep state is relatively low power state (of available power states). In various implementations, the sleep state is a minimum power consumption state in which power is not turned off. When the memories 114, 124, 134 and 144 utilize DRAM, the memories 114, 124, 134 and 144 are volatile memories. In some implementations, the sleep state is a component idle state with the lowest available voltage magnitude of any of one or more component idle states. A memory of the memories 114, 124, 134 and 144 has power consumption reduced, but this memory also retains sufficient configuration information (or context information) to return to the active state without restarting the operating system.

In another implementation, the sleep state is a component idle state with a voltage magnitude lower than a voltage magnitude provided by the active state, but higher than the lowest available voltage magnitude of any of one or more component idle states. In an implementation, in the sleep state, the power management circuitry additionally turns off the power supply reference level to portions of the one or more corresponding chiplets of the chiplets 110, 120, 130 and 140, and these portions do not include the caches 112, 122, 132 and 142. For example, the power management circuitry sends control signals to power switches that disconnect, from a physical voltage plane, the power supply reference level used by the portions of the one or more corresponding chiplets of the chiplets 110, 120, 130 and 140. The sleep state and one or more active states can be associated with one or more power-performance states (P-states) that indicate a respective power domain managed by the power management circuitry. The sleep state and one or more active states can be associated with one or more states of the Advanced Configuration and Power Interface (ACPI) standard. States of another standard are also possible and contemplated.

Initially, the power management circuitry does not transition the chiplet 110 to a non-active state, but maintains the chiplet 110 in one of multiple active states. In an implementation, the power management circuitry transitions each of the chiplets 120, 130 and 140 to a non-active state. For example, the power management circuitry powers down portions of the chiplets 120, 130 and 140 other than the caches 122, 132 and 142. The power management circuitry removes the power supply reference level from the portions of the chiplets 120, 130 and 140 other than the caches 122, 132 and 142. The power management circuitry maintains connection to a power supply reference level for the caches 122, 132 and 142, but with a voltage magnitude associated with the sleep state. In some implementations, the voltage magnitude provided by the power supply reference level of the sleep state is based on reducing leakage current of devices (transistors) within the caches 122, 132 and 142. With the caches 122, 132 and 142 still connected to a voltage plane and maintaining a power supply reference level, the integrated circuit 100 implements the caches 122, 132 and 142 as persistent memory, or non-volatile memory.

During the idle state of the video subsystem, the chiplet 110, which stores data of the given type (portions "17" to "20"), processes any generated requests targeting the data of the given type. For example, despite not requesting new frame data to be rendered, the display device of the computing system still performs refresh operations. In this case, the data of the given type (portions "17" to "20") are a subset of the entire rendered data of the last frame (portions "17" to "32") to be processed before the transition to the idle state indicating a static screen of the display device.

To perform the refresh operations, the display device requests data of the given type (portions "17" to "32") from the chiplets 110, 120, 130 and 140. After accessing portion "20" from chiplet 110, the power management circuitry transitions the chiplet 120 from the sleep state to the active state, and transitions the chiplet 110 from the active state to the sleep state. For example, the power management circuitry (or other circuitry) reconnects the power supply reference level to portions of the chiplet 120 by sending control signals to power switches that reconnect, to a physical voltage plane, the power supply reference level used by these portions. The power management circuitry (or other circuitry) transitions the cache 122 from the sleep state to the active state. Additionally, the power management circuitry (or other circuitry) disconnects the power supply reference level from the portions of the chiplet 110 other than the cache 112 by sending control signals to power switches that disconnect, to a physical voltage plane, the power supply reference level used by these portions. The power management circuitry (or other circuitry) transitions the cache 112 from the active state to the sleep state. With the cache 112 still connected to a voltage plane and maintaining a power supply reference level, the integrated circuit 100 implements the cache 112 as persistent memory, or non-volatile memory. Therefore, a single chiplet is in the active state while the remaining chiplets are in the sleep state, or otherwise powered down to reduce power consumption. Similarly, after accessing portions "21 to "24" from chiplet 120, the power management circuitry transitions the chiplet 130 from the sleep state to the active state, and transitions the chiplet 120 from the active state to the sleep state using similar steps.

Further, after accessing portions "25" to "28" from chiplet 130, the power management circuitry transitions the chiplet 140 from the sleep state to the active state, and transitions the chiplet 130 from the active state to the sleep state using the steps described in the above description directed toward chiplets 110 and 120. Continuing, after accessing portions "29" to "32" from chiplet 140, the power management circuitry transitions the chiplet 110 from the sleep state to the active state, and transitions the chiplet 140 from the active state to the sleep state. These steps are repeated during the video refresh operations. Therefore, a single chiplet is in the active state while the remaining chiplets are in the sleep state, or otherwise powered down to reduce power consumption. While still supporting the refresh operations, the integrated circuit 100 reduces power consumption by maintaining a single chiplet of chiplets 110, 120, 130 and 140 in the active state while the remaining chiplets of chiplets 110, 120, 130 and 140 are in the sleep state. Additionally, each of the memories 114, 124, 134 and 144 is in the sleep state.

Figure 2:
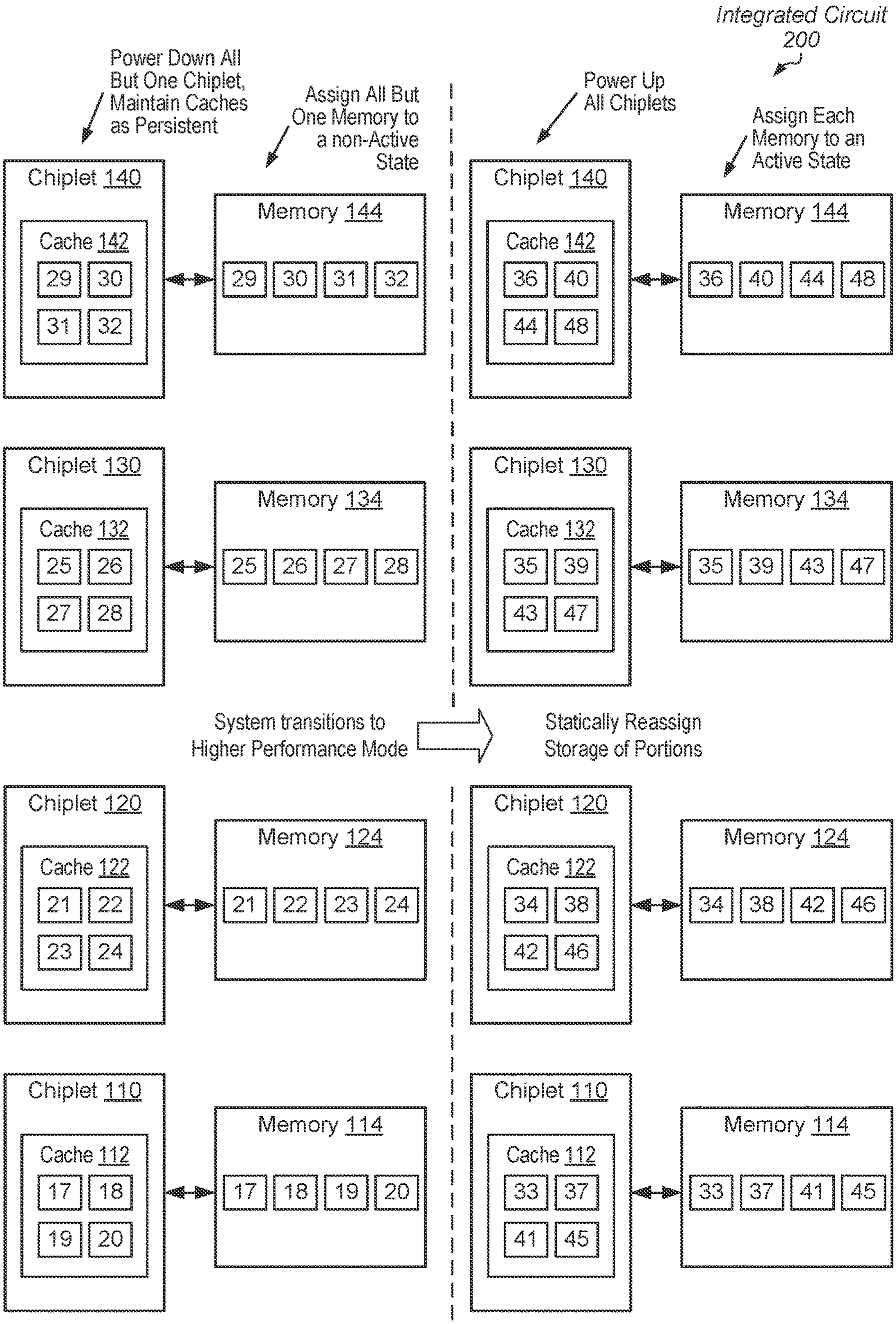
FIG. 2 is a generalized block diagram of an integrated circuit that manages power consumption among replicated chiplets.

Referring to FIG. 2, a generalized block diagram is shown of an integrated circuit 200 that manages power consumption among replicated chiplets. Circuits and signals described earlier are numbered identically. Here, each of the chiplets 110, 120, 130 and 140, and each of the memories 114, 124, 134 and 144, store a corresponding copy of the portions "17" to "32" in a contiguous manner as shown earlier. Control circuitry, such as the power management circuitry (or other control circuitry), determines the integrated circuit 200 is in a high-performance mode or assigns the integrated circuit 200 to the high-performance mode. Similar to the low-performance mode, the high-performance mode is a mode of operation associated with a power domain of multiple power domains. The high-performance mode is associated with a high-power (and high performance) power domain. For example, a video graphics workload ends the idle state indicating a static screen of the display device, and resumes rendering video frame data for the display device.

The control circuitry sends commands or indications to either the chiplets 110, 120, 130 and 140, or a direct memory access (DMA) engine. These commands or indications specify storing data of the given type in an interleaved manner among the memories 114, 124, 134 and 144, rather than in a contiguous manner in the memories 114, 124, 134 and 144. It is noted that these commands used when the integrated circuit 200 is in a high-performance mode perform the opposite storage arrangement (from the contiguous manner to the interleaved manner) than the storage arrangement (from the interleaved manner to the contiguous manner) used when the integrated circuit 100 (of FIG. 1) is in a low-performance mode as described earlier for the integrated circuit 100. The power management circuitry transitions each of the memories 114, 124, 134 and 144 of the integrated circuit 200 from the sleep state to an active state. The power management circuitry transitions each of the chiplets 110, 120, 130 and 140 that is in the sleep state, or otherwise powered down to reduce power consumption, to an active state. When new data of the given type is retrieved from the DMA engine or other unit, and sent to the integrated circuit 200, the new data of the given type is now stored in an interleaved manner among the memories 114, 124, 134 and 144, rather than in a contiguous manner in the memories 114, 124, 134 and 144. For example, the new data includes the portions "33" to "48." The memory 114 stores portions "33," "37," "41" and "45." Memories 124, 134 and 144 store portions of the new data in an interleaved manner as well.

Figure 3:
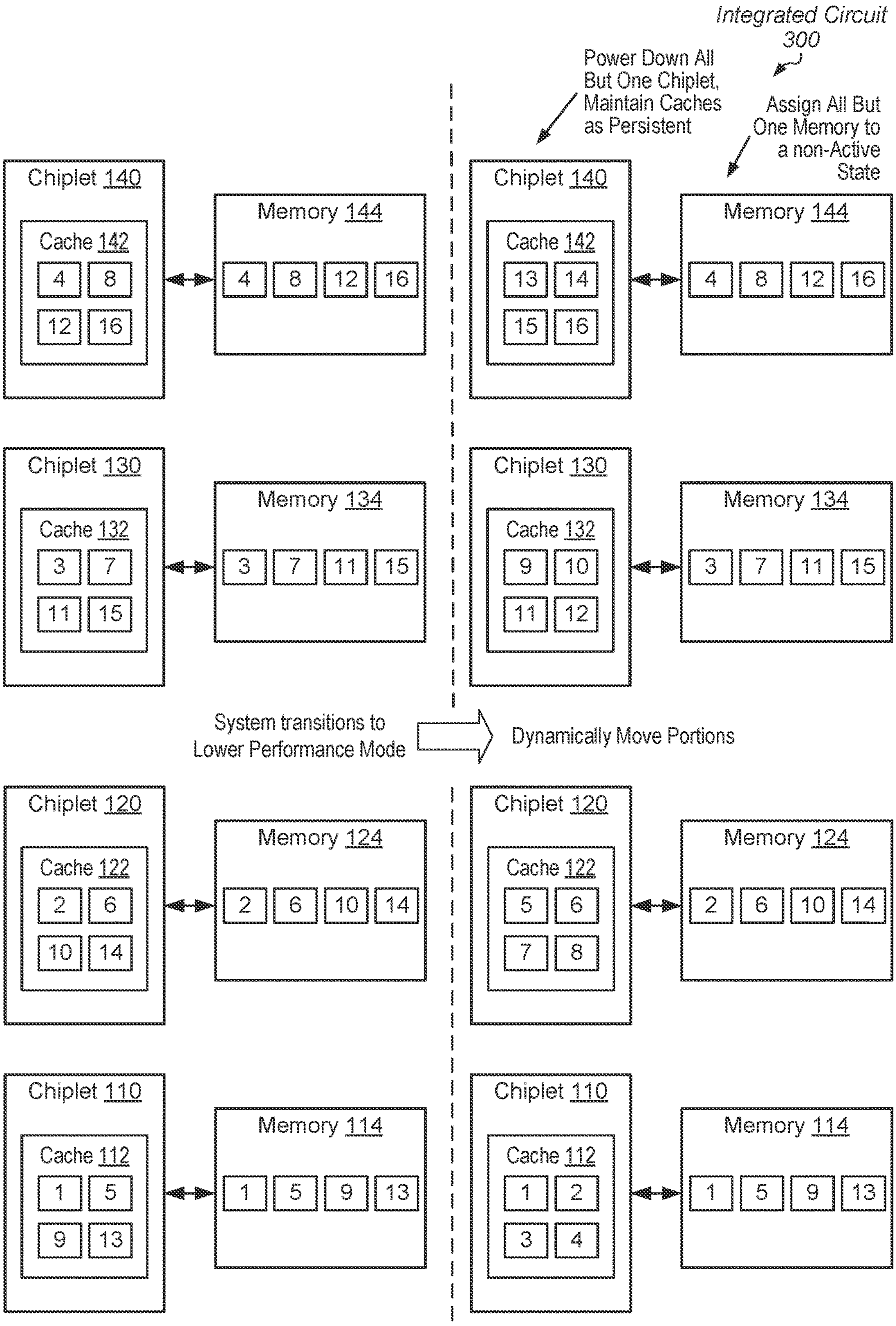
FIG. 3 is a generalized block diagram of an integrated circuit that manages power consumption among replicated chiplets.

Turning now to FIG. 3, a generalized block diagram is shown of an integrated circuit 300 that manages power consumption among replicated chiplets. Circuits and signals described earlier are numbered identically. Here, each of the chiplets 110, 120, 130 and 140, and each of the memories 114, 124, 134 and 144, store a corresponding copy of the portions "1" to "16" in an interleaved manner as shown earlier. Control circuitry, such as the power management circuitry (or other control circuitry), determines the integrated circuit 100 transitions to a low-performance mode or assigns the integrated circuit 100 to the low-performance mode. Control circuitry sends commands or indications to either the chiplets 110, 120, 130 and 140, or a direct memory access (DMA) engine. These commands or indications specify maintaining storage of data of the given type in an interleaved manner in the memories 114, 124, 134 and 144, and additionally, transferring data of the given type between the chiplets 110, 120, 130 and 140, until data of the given type is stored in a contiguous manner in the chiplets 110, 120, 130 and 140.

As a result of the above commands or indications, the chiplet 120 sends the copy of portion "2" to be stored in cache 112 of chiplet 110. The copy of portion "2" stored in memory 124 remains in memory 124. The chiplet 110 does not store a copy of portion "2" in memory 114. Regardless of supporting a writethrough cache policy or a writeback cache policy, the caches 112, 122, 132 and 142 do not send updates to the memories 114, 124, 134 and 144 when transferring data between the caches 112, 122, 132 and 142. In a similar manner, the chiplet 130 sends the copy of portion "3" to be stored in cache 112 of chiplet 110. The copy of portion "3" stored in memory 134 remains in memory 134. The chiplet 110 does not store a copy of portion "3" in memory 114.

Additionally, the chiplet 130 sends the copy of portion "7" to be stored in cache 122 of chiplet 120. The copy of portion "7" stored in memory 134 remains in memory 134. The chiplet 120 does not store a copy of portion "7" in memory 124. The chiplet 110 sends the copy of portion "13" to be stored in cache 142 of chiplet 140. The copy of portion "13" stored in memory 114 remains in memory 114. The chiplet 140 does not store a copy of portion "13" in memory 144. Other data transfers are performed in this manner among the chiplets 110, 120, 130 and 140 until the portions "1" to "16" are stored in a contiguous manner in the caches 112-142. It is noted that in a case where cache 112 does not have sufficient temporary data storage to simultaneously store portions "1," "2," "5," "9," and "13," the cache 112 overwrites portion "5" with portion "2," and later chiplet 110 sends a copy of portion "5" from memory 114 to cache 122 of chiplet 120, rather than from cache 112. Other chiplets perform similar steps when their respective caches do not include sufficient temporary data storage.

Following the data transfers, the power management circuitry transitions each of the memories 114, 124, 134 and 144 to a sleep state. In addition, the power management circuitry transitions one or more of the chiplets 120, 130 and 140 to a sleep state, or otherwise powered down to reduce power consumption. The power management circuitry does not transition the chiplet 110 to the sleep state, but maintains the chiplet 110 in one of multiple active states. In an implementation, the power management circuitry transitions each of the chiplets 120, 130 and 140 to the sleep state, or otherwise powered down to reduce power consumption. For example, the power management circuitry (or other circuitry) performs the steps described in the above description directed toward the integrated circuit 100. During the idle state of the video subsystem, the chiplet 110, which stores data of the given type (portions "1" to "4"), processes any generated requests targeting the data of the given type. For example, despite not requesting new frame data to be rendered, the display device of the computing system still performs refresh operations. In this case, the data of the given type (portions "1" to "4") are a subset of the entire rendered data of the last frame (portions "1" to "16") to be processed before the transition to the idle state indicating a static screen of the display device.

To perform the refresh operations, the display device requests data of the given type (portions "1" to "16") from the chiplets 110, 120, 130 and 140. After accessing portion "4" from chiplet 110, the power management circuitry transitions the chiplet 120 from the sleep state to the active state, and transitions the chiplet 110 from the active state to the sleep state. For example, the power management circuitry (or other circuitry) reconnects the power supply reference level to the portions of the chiplet 120 other than the cache 122 by sending control signals to power switches that reconnect, to a physical voltage plane, the power supply reference level used by these portions. The power management circuitry (or other circuitry) transitions the cache 122 from the sleep state to the active state. Additionally, the power management circuitry (or other circuitry) disconnects the power supply reference level from the portions of the chiplet 110 other than the cache 112 by sending control signals to power switches that disconnect, to a physical voltage plane, the power supply reference level used by these portions. The power management circuitry (or other circuitry) transitions the cache 112 from the active state to the sleep state. Therefore, a single chiplet is in the active state while the remaining chiplets are in the sleep state. Similarly, after accessing portions "5" to "8" from chiplet 120, the power management circuitry transitions the chiplet 130 from the sleep state to the active state, and transitions the chiplet 120 from the active state to the sleep state using similar steps as the transitions for chiplets 110 and 120.

Further, after accessing portions "9" to "12" from chiplet 130, the power management circuitry transitions the chiplet 140 from the sleep state to the active state, and transitions the chiplet 130 from the active state to the sleep state. Continuing, after accessing portions "29" to "32" from chiplet 140, the power management circuitry transitions the chiplet 110 from the sleep state to the active state, and transitions the chiplet 140 from the active state to the sleep state. These steps are repeated during the video refresh operations. Therefore, a single chiplet is in the active state while the remaining chiplets are in the sleep state, or otherwise powered down to reduce power consumption. While still supporting the refresh operations, the integrated circuit 300 reduces power consumption by maintaining a single chiplet of chiplets 110, 120, 130 and 140 in the active state while the remaining chiplets of chiplets 110, 120, 130 and 140 are in the sleep state. Additionally, each of the memories 114, 124, 134 and 144 is in the sleep state.

Figure 4:
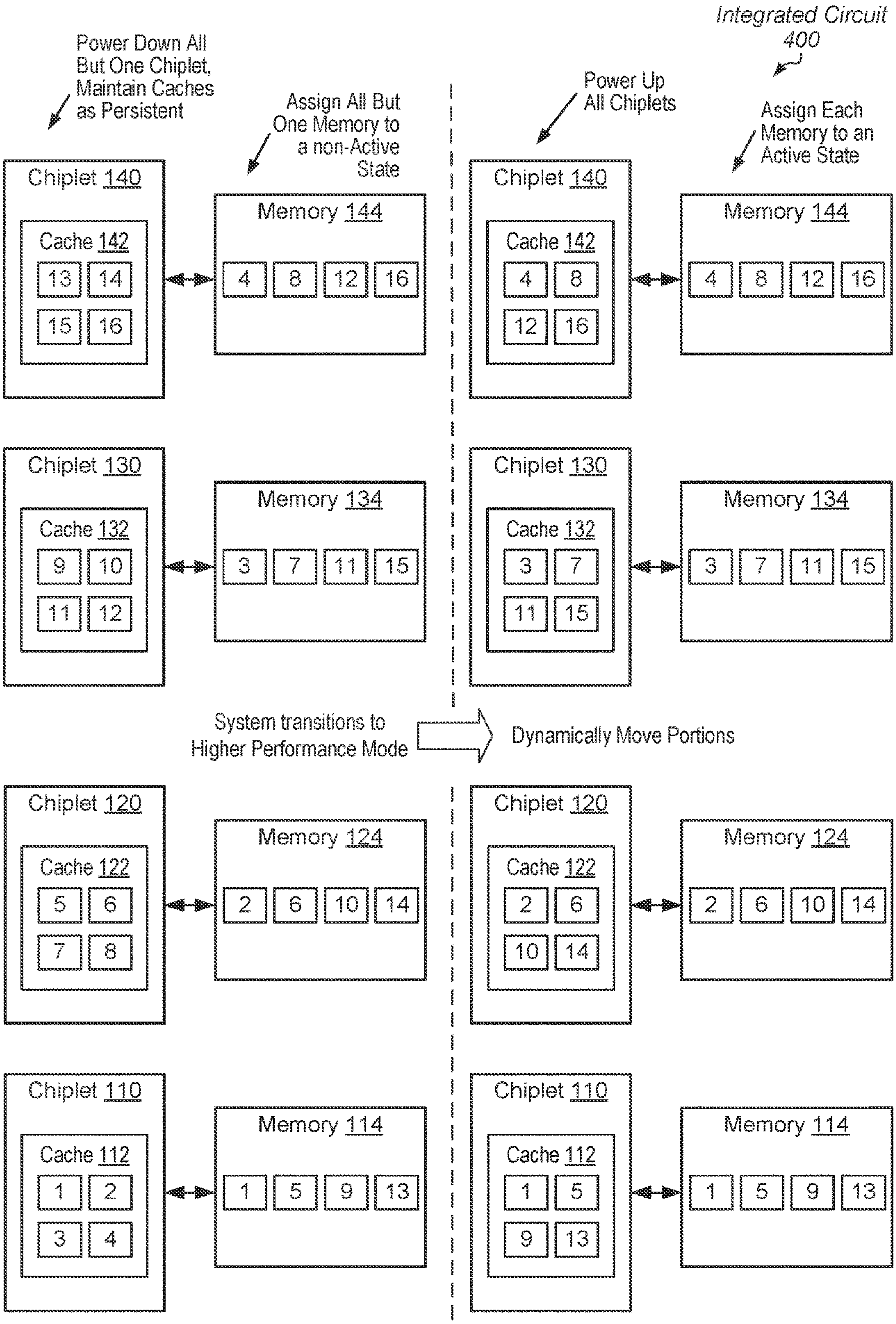
FIG. 4 is a generalized block diagram of an integrated circuit that manages power consumption among replicated chiplets.

Referring to FIG. 4, a generalized block diagram is shown of an integrated circuit 400 that manages power consumption among replicated chiplets. Circuits and signals described earlier are numbered identically. Here, the caches 112, 122, 132 and 142 store corresponding copies of portions "1" to "16" in a contiguous manner. However, the memories 114, 124, 134 and 144 corresponding copies of portions "1" to "16" in an interleaved manner as shown earlier. Control circuitry, such as the power management circuitry (or other control circuitry), determines the integrated circuit 400 is in a high-performance mode or assigns the integrated circuit 400 to the high-performance mode.

The control circuitry sends commands or indications to either the chiplets 110, 120, 130 and 140, or a direct memory access (DMA) engine. These commands or indications specify maintaining storage of data of the given type in an interleaved manner in the memories 114, 124, 134 and 144, and additionally, also storing data of the given type in an interleaved manner in the caches 112, 122, 132 and 142 of the chiplets 110, 120, 130 and 140. The power management circuitry transitions each of the memories 114, 124, 134 and 144 from the sleep state to an active state. The power management circuitry transitions each of the chiplets 110, 120, 130 and 140 that is in the sleep state to an active state. As a result of the received commands or indications, each of the caches 112-142 invalidates its contents, and later fetches the corresponding portions of portions "1" to "16" from memories 114-144. For example, after invalidating its contents, the cache 122 of the chiplet 120 fetches portions "2," "6," "10," and "14" from the memory 124. The other caches 110, 130 and 140 perform similar steps.

Figure 5:
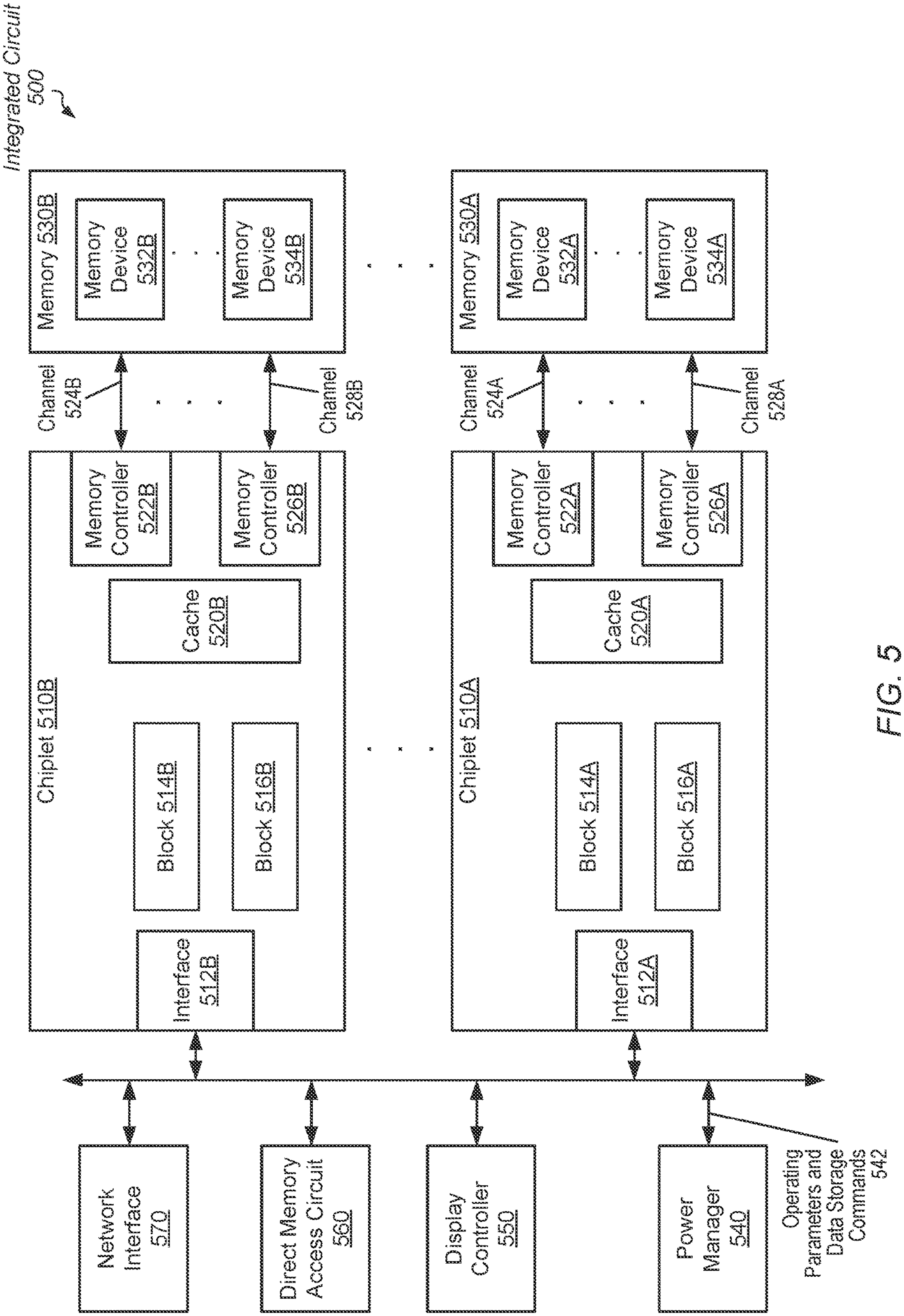
FIG. 5 is a generalized block diagram of apparatus that manages power consumption among replicated chiplets of an integrated circuit.

Referring to FIG. 5, a generalized block diagram is shown of an apparatus 500 that manages power consumption among replicated chiplets of an integrated circuit. In the illustrated implementation, the apparatus 500 includes the power manager 540, the display controller 550, the direct memory access (DMA) circuit 560 (or DMA engine 560), the network interface 570, and at least two chiplets such as chiplets 510A-510B. In various implementations, the circuitry of the chiplet 510B is an instantiation of the circuitry of the chiplet 510A. Although only two chiplets 510A-510B are shown, other numbers of chiplets used by apparatus 500 are possible and contemplated and the number is based on design requirements. Other components of the apparatus 500 are not shown for ease of illustration. For example, an off-chip memory controller, one or more input/output (I/O) interface units, interrupt controllers, one or more phased locked loops (PLLs) or other clock generating circuitry, and a variety of other functional blocks are not shown although they can be used by the apparatus 500.

In some implementations, the functionality of the apparatus 500 is included as components on a single die such as a single integrated circuit. In an implementation, the functionality of the apparatus 500 is included as one die of multiple dies on a multi-chip module (MCM). In various implementations, the apparatus 500 is used in a desktop, a portable computer, a mobile device, a server, a peripheral device, or other. The apparatus 500 is also capable of communicating with a variety of other external circuitry such as one or more of a digital signal processor (DSP), a variety of application specific integrated circuits (ASICs), a multimedia engine, and so forth.

The hardware, such as circuitry, of each of the blocks 514A and 516A provides a variety of functionalities. In some implementations, one or more of the blocks 514A and 516A include a relatively wide single-instruction-multiple-data (SIMD) microarchitecture. For example, one or more of the blocks 514A and 516A is used as a dedicated GPU (or dGPU), a dedicated video graphics chip or chipset, or other. In some implementations, one or more of the blocks 514A and 516A render video frame data that is later sent to the display controller 550. In an implementation, the cache 520A is a last-level cache of a cache memory subsystem hierarchy. The cache 520A can support a writeback policy, or the cache 520A can support a writethrough policy. The chiplet 510A uses the local memory controllers 522A and 526A to transfer data with the local memory 530A via the communication channels 524A and 528A.

The local memory 530A includes the memory devices 532A and 534A. In some implementations, each of the memory devices 532A and 534A is one of a variety of types of synchronous dynamic random-access memory (SDRAM) specifically designed for applications requiring both high memory data bandwidth and high memory data rates. In other implementations, each of the memory devices 532A and 534A is another type of DRAM. In various implementations, each of the communication channels 524A and 528A is a point-to-point (P2P) communication channel. A point-to-point communication channel is a dedicated communication channel between a single source and a single destination. Therefore, the point-to-point communication channel transfers data only between the single source and the single destination. The address information, command information, response data, payload data, header information, and other types of information are transferred on metal traces or wires that are accessible by only the single source and the single destination. In an implementation, the local memory controllers 522A and 526A support one of a variety of types of a Graphics Double Data Rate (GDDR) communication protocol.

It is noted that although the communication channels 524A and 528A use the term "communication channel," each of the communication channels 524A and 528A is capable of transferring data across multiple memory channels supported by a corresponding memory device. For example, a single memory channel of a particular memory device can include 60 or more individual signals with 32 of the signals dedicated for the response data or payload data. A memory controller or interface of the memory device can support multiple memory channels. Each of these memory channels is included within any of the communication channels 524A and 528A.

The interface 512A includes circuitry that allows the chiplet 510A to communicate with external integrated circuits such as at least the components 540-570 shown. One or more of a communication bus, a point-to-point channel, a communication fabric, or other are used to transfer data and commands between the chiplets 510A-510B and at least the components 540-570. The network interface 570 supports a communication protocol for communication with one of a variety of types of a network. The DMA circuit 560 supports memory mapping and a communication protocol used to communicate with one of a variety of types of system memory. The display controller 550 receives rendered video frame data from the chiplets 510A-510B and prepares this data to present an image on a corresponding display device. Each of the chiplets 510A-510B and each of the caches 520A-520B is assigned a respective power domain by the power manager 540. The power domain includes at least operating parameters such as at least an operating power supply voltage and an operating clock frequency. Each of the power domains also includes control signals for enabling and disabling connections to clock generating circuitry and a power supply reference. Therefore, the caches 520A-520B are implemented as persistent memory similar to the caches 112, 122, 132 and 142 (of FIGS. 1-4).

In some implementations, the hardware, such as circuitry, of the power manager 540 determines when tasks of a workload enter an idle state. In other implementations, the power manager 540 receives an indication of the idle state. The idle state can indicate a static screen of the display device connected to the display controller 550. For example, a video graphics application no longer updates frame data to be viewed on the display device. It is possible that the video graphics application is paused or is waiting for further user input, and during the wait time, the scene or image is not updated on the display device. Therefore, the video processing subsystem of the computing system, such as the chiplets 510A-510B, enters an idle state although the video graphics application has not stopped being executed. The power manager 540 sends operating parameters and data storage commands 542 to one or more of the DMA circuit 560 and the chiplets 510A-510B. For example, the power manager 540 performs the steps described regarding the description of power management by the integrated circuits 100-400 (of FIGS. 1-4). In another implementation, other circuitry other than the power manager 540 sends the data storage commands 542 to the chiplets 510A-510B. In some implementations, each of the chiplets 510A-510B has the functionality of the chiplets 110-140 (of FIGS. 1-4).

Figure 6:
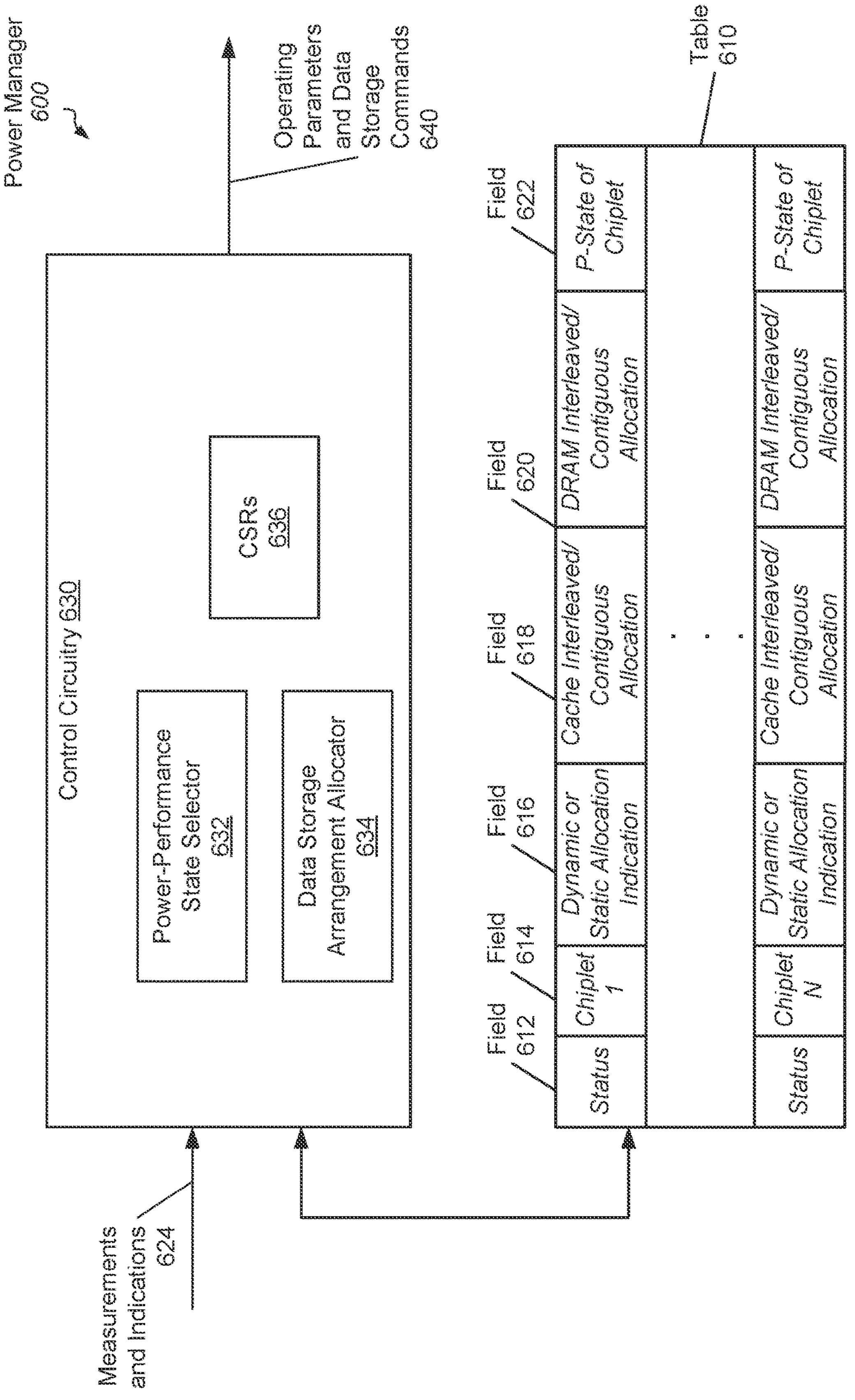
FIG. 6 is a generalized block diagram of a power manager that manages power consumption among replicated functional blocks of an integrated circuit.

Turning now to FIG. 6, a generalized block diagram is shown of a power manager 600 that manages power consumption among replicated chiplets of an integrated circuit. As shown, the power manager 600 includes the table 610 and the control circuitry 630. The control circuitry 630 includes multiple components 632-638 that are used to generate the operating parameters and data storage commands 640 to update power domains of multiple chiplets. The table 610 includes multiple table entries (or entries), each storing information in multiple fields such as at least fields 612-622. The table 610 is implemented with one of flip-flop circuits, a random-access memory (RAM), a content addressable memory (CAM), or other. Although particular information is shown as being stored in the fields 612-622 and in a particular contiguous order, in other implementations, a different order is used and a different number and type of information is stored. As shown, field 612 stores status information such as at least a valid bit. Field 614 stores an identifier that specifies one of the multiple chiplets.

Field 616 stores an indication of whether dynamic identification or static allocation is being used for storing data of a given type in the multiple chiplets. Field 618 stores an indication specifying whether a cache of the corresponding chiplet is storing data of the given type in a contiguous manner or an interleaved manner. Field 620 stores a value indicating whether a memory of the corresponding chiplet, such as DRAM used as local memory, is storing data of the given type in a contiguous manner or an interleaved manner. Field 622 stores a current value indicating the most-recent P-state or power domain for the corresponding chiplet.

The control circuitry 630 receives usage measurements and indications 624, which represent activity levels of the chiplets and power consumption measurements or parameters used to determine recent power consumption values of the chiplets. The power-performance state (P-state) selector 632 selects the next operating parameters to use for the chiplets. The data storage arrangement allocator 634 (or allocator 634) includes circuitry that determines whether the caches and the memories store data of the given type in a contiguous manner or an interleaved manner.

In some implementations, the data of the given type is video frame data. Based on one or more of the expected size of the video frame data, the sizes of the last-level caches of the chiplets, expected performance degradation when accessing data in a contiguous manner from the memories, any quality of service (QOS) values associated with the video graphics application, values stored in the table 610, and so on, the allocator 634 determines whether the caches and the memories store data of the given type in a contiguous manner or an interleaved manner. One or more components of the power manager 600 use values stored in the configuration and status registers (CSRs) 636. The CSRs 636 store the above examples of values used by the allocator 634. In some implementations, one or more of the components of power manager 600 and corresponding functionality is provided in another external circuit, rather than provided here in power manager 600.

Figure 7:
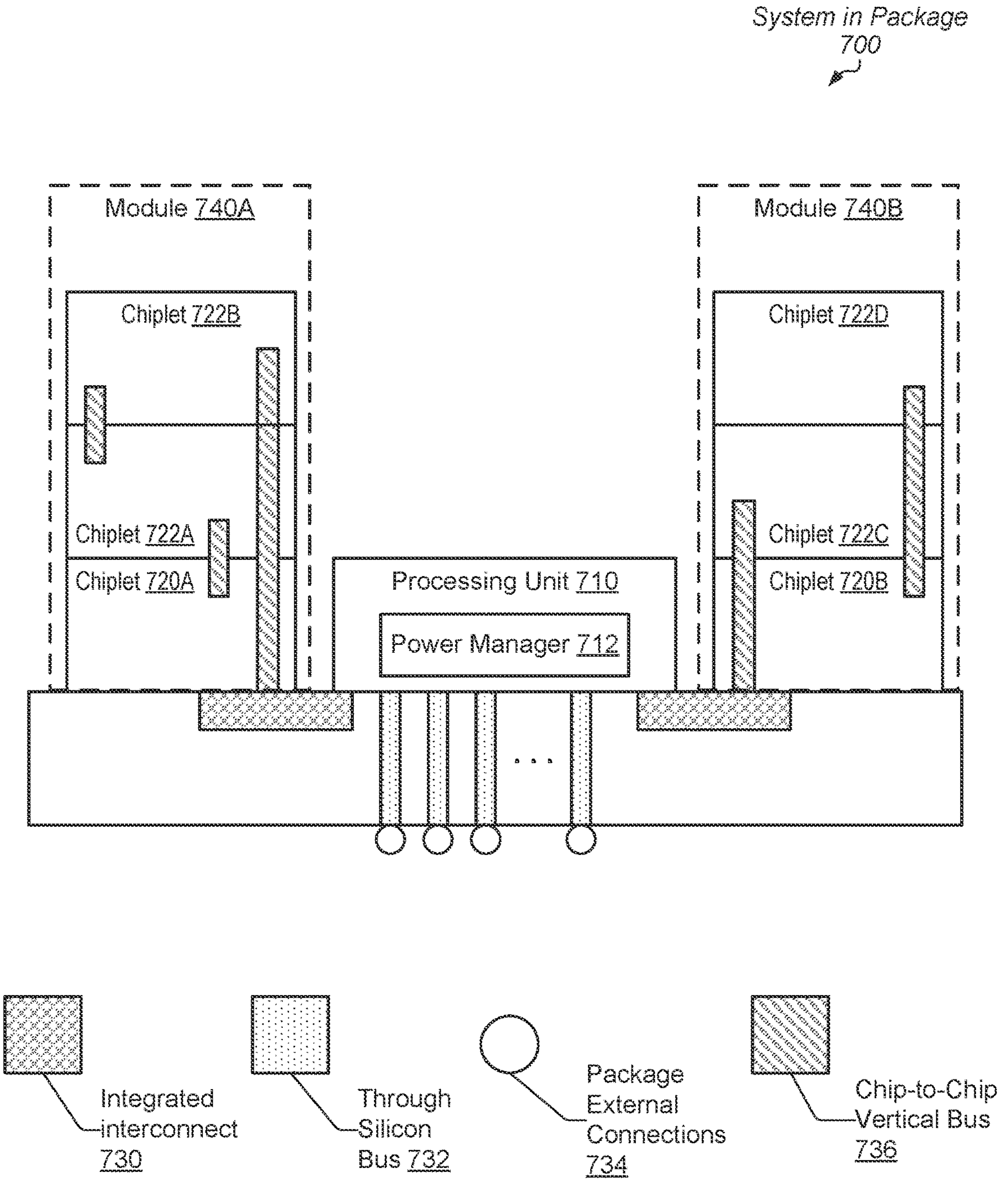
FIG. 7 is a generalized block diagram of a system-in-package that manages power consumption among replicated functional blocks of an integrated circuit.

Turning now to FIG. 7, a generalized block diagram is shown of a system-in-package (SiP) 700 that manages power consumption among replicated chiplets of an integrated circuit. In various implementations, three-dimensional (3D) packaging is used within a computing system. This type of packaging is referred to as a System in Package (SiP). A SiP includes one or more three-dimensional integrated circuits (3D ICs). A 3D IC includes two or more layers of active electronic components integrated both vertically and/or horizontally into a single circuit. In one implementation, interposer-based integration is used whereby the 3D IC is placed next to the processing unit 710. Alternatively, a 3D IC is stacked directly on top of another IC.

Die-stacking technology is a fabrication process that enables the physical stacking of multiple separate pieces of silicon (integrated chips) together in a same package with high-bandwidth and low-latency interconnects. In some implementations, the die is stacked side by side on a silicon interposer, or vertically directly on top of each other. One configuration for the SiP is to stack one or more semiconductor dies (or dies) next to and/or on top of a processing unit such as processing unit 710. In an implementation, the SiP 700 includes the processing unit 710 and the modules 740A-740B. Module 740A includes the chiplet 720A and the chiplets 722A-722B. In various implementations, the chiplets 720A and 722A-722B are multiple three-dimensional (3D) semiconductor dies. Although a particular number of chiplets are shown, any number of chiplets is used as stacked 3D dies in other implementations.

The chiplet 720A is fabricated on a corresponding silicon wafer that is later dices to provide the chiplet 720A. Each of the chiplets 722A-722B is fabricated on a silicon wafer different from the silicon wafer used to provide the chiplet 720A and separate from the silicon wafer used to provide the processing unit 710. In some implementations, the chiplets 722A-722B include circuitry that renders video frame data that is later sent to a display controller (not shown). Each of the chiplets 722A-722B has a separate power rail, which allows one or more of the chiplets 722A-722B to be placed in a sleep state by the power manager 712 during an idle state that indicates a static screen of a display device. In some implementations, the module 740B is a replication of the module 740A. In various implementations, the power manager 712 has the functionality of the power manager 540 (of FIG. 5) and the power manager 600 (of FIG. 6). The power manager 712 is able to perform the steps for power management described regarding the integrated circuits 100-400 (of FIGS. 1-4).

Each of the modules 740A-740B communicates with the processing unit 710 through horizontal low-latency interconnect 730. In various implementations, the processing unit 710 is a general-purpose central processing unit; a graphics processing unit (GPU), an accelerated processing unit (APU), a field programmable gate array (FPGA), or other data processing device. The in-package horizontal low-latency interconnect 730 provides reduced lengths of interconnect signals versus long off-chip interconnects when a SiP is not used. The in-package horizontal low-latency interconnect 730 uses particular signals and protocols as if the chips, such as the processing unit 710 and the modules 740A-740B, were mounted in separate packages on a circuit board. In some implementations, the SiP 700 additionally includes backside vias or through-bulk silicon vias 732 that reach to package external connections 734. The package external connections 734 are used for input/output (I/O) signals and power signals.

In various implementations, multiple device layers are stacked on top of one another with direct vertical interconnects 736 tunneling through them. In various implementations, the vertical interconnects 736 are multiple through silicon vias grouped together to form through silicon buses (TSBs). The TSBs are used as a vertical electrical connection traversing through a silicon wafer. The TSBs are an alternative interconnect to wire-bond and flip chips. The size and density of the vertical interconnects 736 that can tunnel between the different device layers varies based on the underlying technology used to fabricate the 3D ICs. As shown, some of the vertical interconnects 736 do not traverse through each of the modules 740A-740B. Therefore, in some implementations, the processing unit 710 does not have a direct connection to one or more dies such as die 722D in the illustrated implementation. Therefore, the routing of information relies on the other dies of the SiP 700.

For methods 800 and 900 (of FIGS. 8-9), an integrated circuit includes multiple replicated chiplets. Each chiplet includes circuitry operable to use a separate power domain. Therefore, circuitry of a first chiplet shares at least a same first power rail and a same first clock reference signal. Similarly, the circuitry of a second chiplet shares at least a same second power rail and a same second clock reference signal. The second power rail is different from the first power rail, and the second clock reference signal is different from the first clock reference signal. Therefore, at least the second chiplet uses a different power domain than the first chiplet, and thus, the second chiplet is capable of using different operating parameters than the first chiplet. For example, one of the first chiplet and the second chiplet is able to be powered down or placed in a sleep state while the other chiplet remains in one of multiple active states.

In the case of using an MCM, one or more of the chiplets are connected to separate power rails, and therefore, can use separate power domains. Similarly, in the case of using an SoC, one or more of the functional blocks are connected to separate power rails, and therefore, can use separate power domains. Therefore, the techniques and steps described earlier and described in the upcoming description directed to power management of multiple, replicated chiplets placed in a MCM are also applicable for power management of multiple, replicated functional blocks placed in an SoC where separate power rails are used for separate replicated functional blocks.

Figure 8:
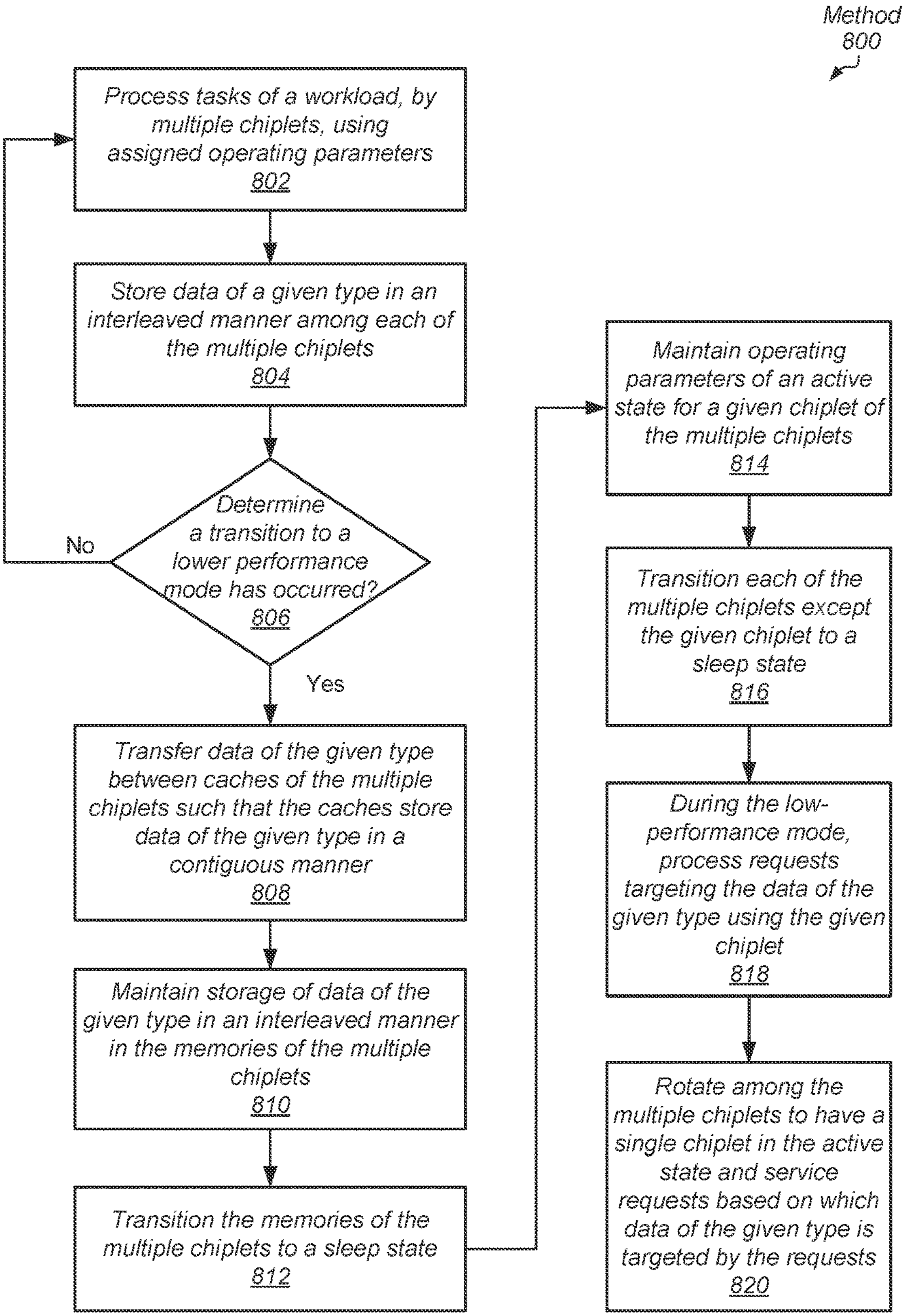
FIG. 8 is a generalized diagram of a method for efficiently managing power consumption among replicated functional blocks of an integrated circuit.

Referring to FIG. 8, a generalized block diagram is shown of a method 800 for efficiently managing power consumption among replicated chiplets of an integrated circuit. For purposes of discussion, the steps in this implementation (as well as in FIG. 9) are shown in sequential order. However, in other implementations some steps occur in a different order than shown, some steps are performed concurrently, some steps are combined with other steps, and some steps are absent.

Hardware, such as circuitry, of multiple chiplets of an integrated circuit process tasks of a workload using assigned operating parameters (block 802). In various implementations, a power manager assigns a respective power domain to each of the chiplets. Each of the power domains includes at least operating parameters such as at least an operating power supply voltage and an operating clock frequency. Each of the power domains also includes control signals for enabling and disabling connections to clock generating circuitry and a power supply reference. In an implementation, the multiple chiplets process tasks of a video graphics workload such as rendering video frame data for a display device. The data of a given type is video frame data of a frame buffer that has been rendered by the multiple chiplets. This data of the given type is sent from the multiple chiplets to a display device.

The multiple chiplets store data of the given type in an interleaved manner among each of the multiple chiplets (block 804). For example, a first portion of the data of the given type is stored in a first chiplet, and a second portion different from the first portion of the data of the given type is stored in a second chiplet. A third portion different from the first portion and the second portion of the data of the given type is stored in a third chiplet, and so on. When the last chiplet of the multiple chiplets has a portion of the data of the given type stored in it, a next portion of the data of the given type is stored in the first chiplet. Data storage of the data of the given type continues in this manner. In some implementations, each portion is a contiguous portion compared to a previous portion, and each portion has a same size. In other implementations, one or more portions have a different size, and one or more portions is not a contiguous portion compared to a previous portion.

In various implementations, the multiple chiplets store data in a local memory device such as one of a variety of types of DRAM. In addition, the multiple chiplets store a copy of the data of the given type in a corresponding cache. In an implementation, the cache is a last-level cache of a cache memory subsystem hierarchy. The cache can support a writeback policy, or the cache can support a writethrough policy. In some implementations, the power manager or other control circuitry determines when tasks of a workload cause the integrated circuit to transition to a low-performance mode. In other implementations, the power manager or other control circuitry receives an indication of the low-performance mode. The low-performance mode can indicate a static screen of the display device. For example, a video graphics application no longer updates frame data to be viewed on the display device. It is possible that the video graphics application is paused or is waiting for further user input, and during the wait time, the scene or picture is not updated on the display device. Therefore, the video processing subsystem of the computing system that includes the multiple chiplets enters an idle state although the video graphics application has not stopped being executed.

If the control circuitry determines a transition to the low-performance mode has not yet occurred ("no" branch of the conditional branch 806), then control flow of method 800 returns to block 802 where the multiple chiplets of the integrated circuit process tasks of the workload using assigned operating parameters. However, if the control circuitry determines a transition to the low-performance mode has occurred ("yes" branch of the conditional branch 806), then the control circuitry sends commands to the multiple chiplets to transfer data of the given type between their caches (and possibly from their memories in cases where caches do not have sufficient temporary data storage for data transfers) until data of the given type is stored in a contiguous manner in the caches of the chiplets (block 808).

The commands indicate that the memories connected to the chiplets maintain storage of data of the given type in an interleaved manner (block 810). Following, the control circuitry transitions the memories to a sleep state (block 812). The control circuitry sends commands or indications to the chiplets specifying maintaining operating parameters of an active state for a given chiplet of the multiple chiplets (block 814). The control circuitry transitions each of the multiple chiplets except the given chiplet to a sleep state, or otherwise powered down to reduce power consumption (block 816). For example, the control circuitry powers down portions of the multiple chiplets other than the caches. The control circuitry removes the power supply reference level from these portions while maintaining connection to a power supply reference level for the caches of these multiple chiplets except the given chiplet, but with a voltage magnitude associated with the sleep state. In some implementations, the voltage magnitude provided by the power supply reference level of the sleep state is based on reducing leakage current of devices (transistors) within the caches. During the low-performance mode, the chiplets process requests targeting the data of the given type using the given chiplet (block 818). The control circuitry rotates among the multiple chiplets to have a single chiplet in the active state and service requests based on which data of the given type is targeted by the requests (block 820).

Figure 9:
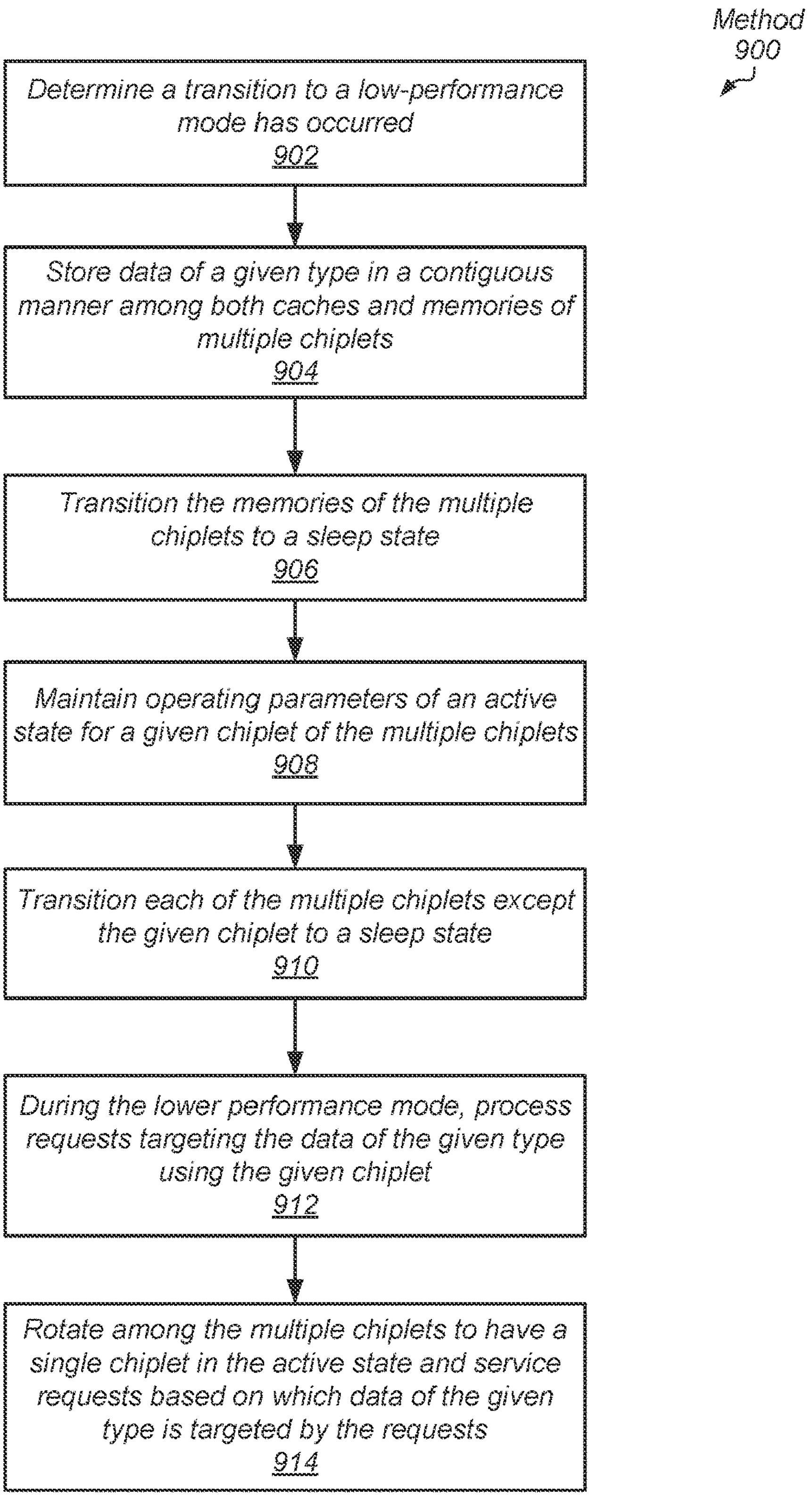
FIG. 9 is a generalized diagram of a method for efficiently managing power consumption among replicated functional blocks of an integrated circuit.

Turning now to FIG. 9, a generalized block diagram is shown of a method 900 for efficiently managing power consumption among replicated chiplets of an integrated circuit. Control circuitry determines a transition to a low-performance mode has occurred (block 902). The control circuitry sends commands or indications to the chiplets specifying storing data of a given type in a contiguous manner among both caches and memories of the multiple chiplets (block 904). The control circuitry transitions the memories of the multiple chiplets to a sleep state (block 906). The control circuitry sends commands or indications to the chiplets specifying maintaining operating parameters of an active state for a given chiplet of the multiple chiplets (block 908). The control circuitry transitions each of the multiple chiplets except the given chiplet to a sleep state, or otherwise powered down to reduce power consumption (block 910). During the low-performance mode, the chiplets process requests targeting the data of the given type using the given chiplet (block 912). The control circuitry rotates among the multiple chiplets to have a single chiplet in the active state and service requests based on which data of the given type is targeted by the requests (block 914).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVER, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:

a plurality of functional blocks configured to store data in an interleaved manner;

and control circuitry;

wherein responsive to a mode of operation, the control circuitry is configured to:

cause data that is stored in two or more of the plurality of functional blocks to be transferred to a selected block of the functional blocks such that the data is stored within the selected block in a contiguous manner; and selectively activate one or more of the plurality of functional blocks to service memory requests based on servicing requirements, while placing at least one other functional block in a reduced-power state.

2. The integrated circuit as recited in claim 1, wherein the mode of operation is a low-performance mode of operation.

3. The integrated circuit as recited in claim 1, wherein the mode of operation corresponds to an idle condition.

4. The integrated circuit as recited in claim 1, wherein responsive to the mode of operation, the control circuitry is further configured to maintain a cache of at least one of the plurality of functional blocks in a sleep state while portions of that functional block are powered down.

5. The integrated circuit as recited in claim 4, wherein each of the plurality of functional blocks is configured to store data in a local cache.

6. The integrated circuit as recited in claim 1, wherein the control circuitry is further configured to rotate among the plurality of functional blocks to determine which functional block is to be activated for servicing memory requests.

7. The integrated circuit as recited in claim 1, wherein the data is video frame data.

8. A method comprising:

storing data, by a plurality of functional blocks, in an interleaved manner; and in response to a mode of operation:

causing, by control circuitry, data that is stored in two or more of the plurality of functional blocks to be transferred to a selected block of the functional blocks such that the data is stored within the selected block in a contiguous manner; and activating, selectively, one or more of the plurality of functional blocks to service memory requests based on servicing requirements, while placing at least one other functional block in a reduced-power state.

9. The method as recited in claim 8, wherein the mode of operation is a low-performance mode of operation.

10. The method as recited in claim 8, wherein the mode of operation corresponds to an idle condition.

11. The method as recited in claim 8, wherein responsive to the mode of operation, the method further comprises maintaining, by the control circuitry, a cache of at least one of the plurality of functional blocks in a sleep state while portions of that functional block are powered down.

12. The method as recited in claim 11, further comprising storing data in a local cache by each of the plurality of functional blocks.

13. The method as recited in claim 11, further comprising communicating with an external memory by a memory interface of each of the plurality of functional blocks.

14. The method as recited in claim 8, wherein the data is video frame data.

15. A computing system comprising:

a display controller;

a plurality of chiplets configured to store data in an interleaved manner; and a power manager;

wherein responsive to a mode of operation, the power manager is configured to:

cause data that is stored in two or more of the plurality of chiplets to be transferred to a selected chiplet such that the data is stored within the selected chiplet in a contiguous manner; and selectively activate one or more of the plurality of chiplets to service memory requests based on servicing requirements, while placing at least one other chiplets in a reduced-power state.

16. The computing system as recited in claim 15, wherein the mode of operation is a low-performance mode of operation.

17. The computing system as recited in claim 15, wherein the mode of operation corresponds to an idle condition.

18. The computing system as recited in claim 15, wherein responsive to the mode of operation, the power manager is further configured to maintain a cache of at least one of the plurality of chiplets in a sleep state while portions of that chiplet are powered down.

19. The computing system as recited in claim 18, wherein each of the plurality of chiplets is configured to store data in a local cache.

20. The computing system as recited in claim 18, wherein each of the plurality of chiplets comprises a memory interface configured to be coupled to an external memory.

* * * * *